(12) United States Patent
Singh

(10) Patent No.: US 9,896,896 B2
(45) Date of Patent: Feb. 20, 2018

(54) HINGED CABLE TERMINATION

(71) Applicant: AKER SOLUTIONS AS, Lysaker (NO)

(72) Inventor: Sandeep Singh, Jar (NO)

(73) Assignee: AKER SOLUTIONS AS, Lysaker (NO)

(*) Notice: Subject to any disclaimer, the term of this patent is extended or adjusted under 35 U.S.C. 154(b) by 0 days.

(21) Appl. No.: 15/036,597

(22) PCT Filed: Dec. 18, 2014

(86) PCT No.: PCT/NO2014/050246
§ 371 (c)(1),
(2) Date: May 13, 2016

(87) PCT Pub. No.: WO2015/093978
PCT Pub. Date: Jun. 25, 2015

(65) Prior Publication Data
US 2016/0281453 A1 Sep. 29, 2016

(30) Foreign Application Priority Data

Dec. 18, 2013 (NO) .................................. 20131737

(51) Int. Cl.
E21B 43/01 (2006.01)
F16C 11/02 (2006.01)
E21B 33/038 (2006.01)
E21B 33/035 (2006.01)
(Continued)

(52) U.S. Cl.
CPC ........ *E21B 33/0385* (2013.01); *E21B 19/002* (2013.01); *E21B 33/0355* (2013.01); *E21B 43/01* (2013.01); *F16C 11/02* (2013.01)

(58) Field of Classification Search
None
See application file for complete search history.

(56) References Cited

U.S. PATENT DOCUMENTS 4,120,171 A 10/1978 Chateau et al.
4,205,379 A 5/1980 Fox et al.
(Continued)

Primary Examiner — Matthew R Buck
Assistant Examiner — Douglas S Wood
(74) Attorney, Agent, or Firm — Birch, Stewart, Kolasch & Birch, LLP

(57) ABSTRACT

A subsea termination head assembly adapted for both communicating and controlled load earning connection via a termination head to a subsea structure to be installed on the seabed, is described. The termination head allows a subsea cable, a power cable, a power umbilical or an umbilical, to be connected to the subsea structure before lowering them as a unit from a vessel and into the sea. The termination head assembly and subsea structure are to be lowered together while concurrently paying out the cable all the way to the seabed. The termination head is arranged to be hingedly connected relative to the subsea structure, which allows the termination head to pivot about a pivot axis in order to let the subsea cable adopt a natural catenary curvature in the sea during lowering thereof. The cable extends in a pigtail loop from the termination head and into the subsea structure. The pigtail loop is able to perform a "rolling motion" during such pivotal movement of the termination head.

20 Claims, 7 Drawing Sheets

Figure 1A:
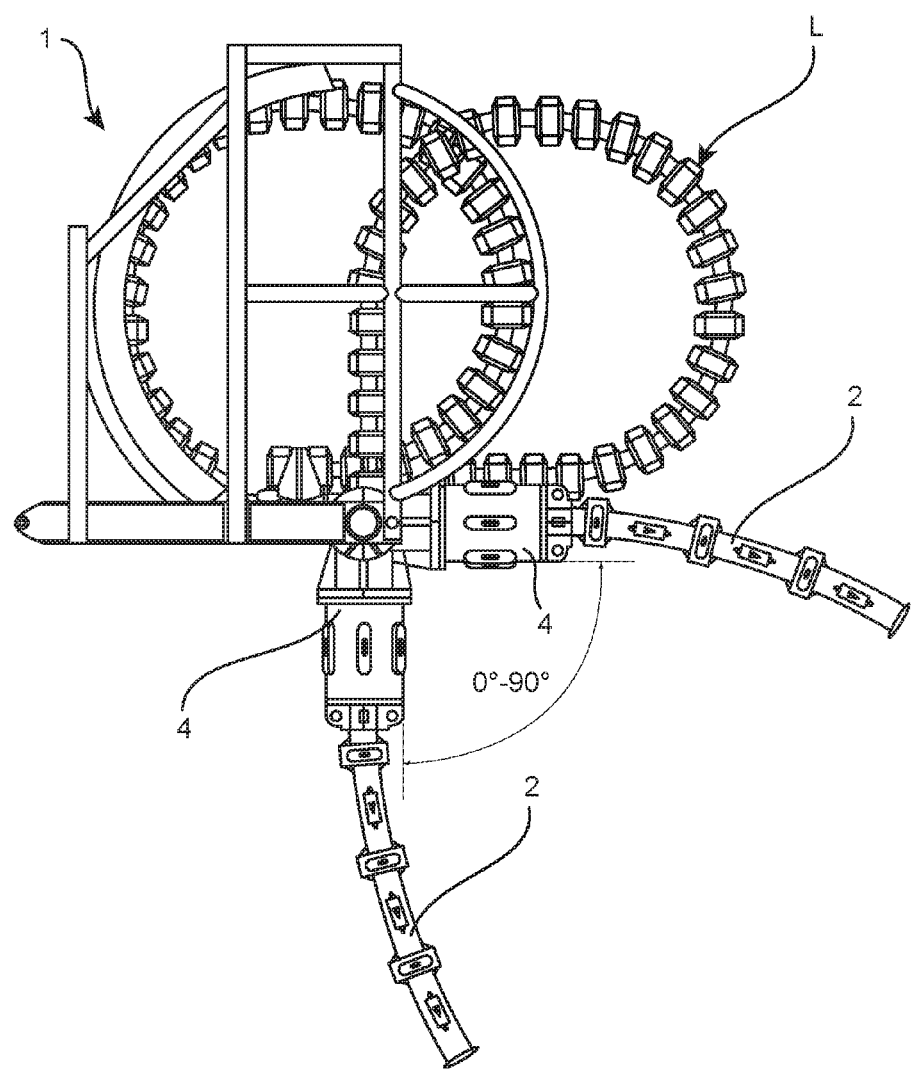

(51) Int. Cl.
*E21B 19/00* (2006.01)
*E21B 19/12* (2006.01)

(56) References Cited

U.S. PATENT DOCUMENTS

| | | | | |
|---|---|---|---|---|
| 4,695,189 | A * | 9/1987 | Wallace | F16L 37/002 166/339 |
| 6,461,083 | B1 * | 10/2002 | Pionetti | E21B 17/015 166/350 |
| 7,025,535 | B2 * | 4/2006 | Chiesa | E21B 17/015 166/350 |
| 7,165,619 | B2 * | 1/2007 | Fox | E21B 7/124 166/343 |
| 8,100,182 | B2 * | 1/2012 | Smith | E21B 43/013 166/339 |
| 2010/0038090 | A1 | 2/2010 | Barratt et al. | |

* cited by examiner

HINGED CABLE TERMINATION

The present invention relates to a subsea termination head assembly adapted for both communicating and controlled load carrying connection via a termination head to a subsea structure to be installed on the seabed, which termination head allows a subsea cable, a power cable, a power umbilical or an umbilical, to be connected to said subsea structure before lowering them as a unit from a vessel and into the sea, which termination head assembly and subsea structure are to be lowered together while concurrently paying out said cable or umbilical all the way to the seabed.

Normally such termination head apparatus will be part of a termination assembly that may also include a subsea distribution unit.

The main challenge with the present invention is related to the installation of a cable, power cable, power umbilical or umbilical together with a termination head and a subsea structure. During lowering thereof, the cable or umbilical will hang in a catenary configuration from the ship to the suspending subsea structure. The cable or umbilical provides large tension loads and it will be a great advantage if the cable or umbilical ends out vertically, like in FIGS. 1A and 1B, in order to reduce the loads at the connecting point and offset loads in the lifting arrangement for the subsea structure. When the subsea structure approaches the seabed, the termination head apparatus will turn or pivot towards a more horizontal position. In the last phase of the cable or umbilical installation, the situation for the subsea structure and cable or umbilical head is according to FIG. 2.

This is solved with a subsea cable termination assembly of the introductory said kind, which is distinguished in that the termination head is arranged to be hingedly connected relative to the subsea structure, which allows the termination head to pivot about a pivot axis in order to let the subsea cable or umbilical adopt a natural catenary curvature in the sea during lowering thereof, which cable or umbilical extends in a pigtail loop from the termination head and into the subsea structure, the pigtail loop being able to perform a "rolling motion" during such pivotal movement of the termination head.

The main functionalities of the hinged termination head technique are:
1. Assembly/mechanism can be integrated to any subsea structure/system where consumables are required.
2. Allows horizontal installation and retrieval of entire module/structure/system(s) (as in FIG. 7).
3. Facilitates both first and second end handling of structure/system to which subsea cable/umbilical/termination head is dry/wet terminated.
4. Reduces intricacies involved with handling of structures/systems integrated with cable(s)/umbilical(s) during offshore/onshore operations.
5. Provides more control over umbilical/cable which is integral part of involved assembly.
6. Significantly reduces the bending moment on structure when compared to a fixed termination head.

Some operational scenarios for the termination head are illustrated in the figures. The methodology is that the termination head shall hinge due to the trunnion and weight of the cable/umbilical which has a resultant force pulling the head towards the global CoG (Centre of Gravity) of the entire structure. This reduces bending moment and tension loads on the termination head and enables them to be taken up in the global lifting arrangement.

Thus, the location of the pivot axis of the hinged termination head will provide that the resultant force from the weight of the cable or the umbilical moves closer to the global center of gravity of the subsea structure.

Preferably, the location of the pivot axis of the hinged termination head is in the lower end of the termination head assembly.

The pivotal angular motions of the termination head will normally be in the order of magnitude approximately 90 degrees, from a substantially horizontal position to a substantially vertical position of the termination head.

In one embodiment the termination head includes trunnions in order to enable pivotal motions about the pivot axis.

Further, the subsea termination head assembly can include a semicircular structure and cable clamps that supports the cable or umbilical in the pigtail loop configuration.

The subsea termination head assembly may further include a semicircular bend restrictor structure supporting the cable or umbilical in the second half of the pigtail loop configuration.

The subsea termination head assembly may further include an intermediate frame structure, which is arranged to carry the termination head, the semicircular structure and the semicircular bend restrictor as a module, which will be an assembly independent from the subsea structure.

The subsea termination head may further include a housing having hang-off split flanges.

The subsea termination head assembly can also include an auxiliary cable drum or umbilical drum arranged to be secured to the intermediate frame structure.

The above features enable the components to be installed together in one lifting operation. The curling or pigtail loop after the hinge eliminates the possibility for the cable or the umbilical elements to deform, like kinking, during installation.

EXAMPLE OF EMBODIMENT

Figure 1B:
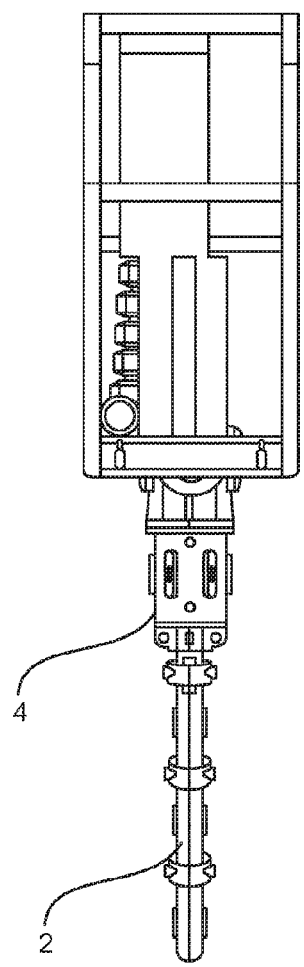
Figure 1C:
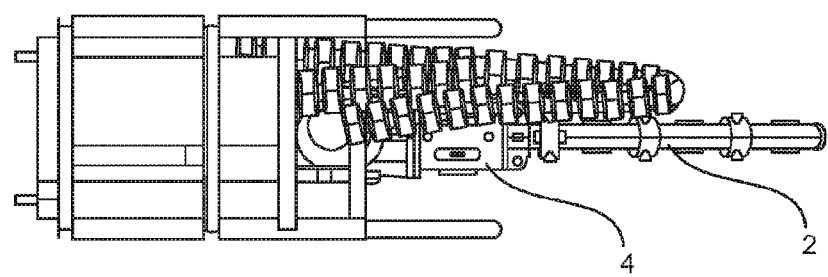
Figure 2:
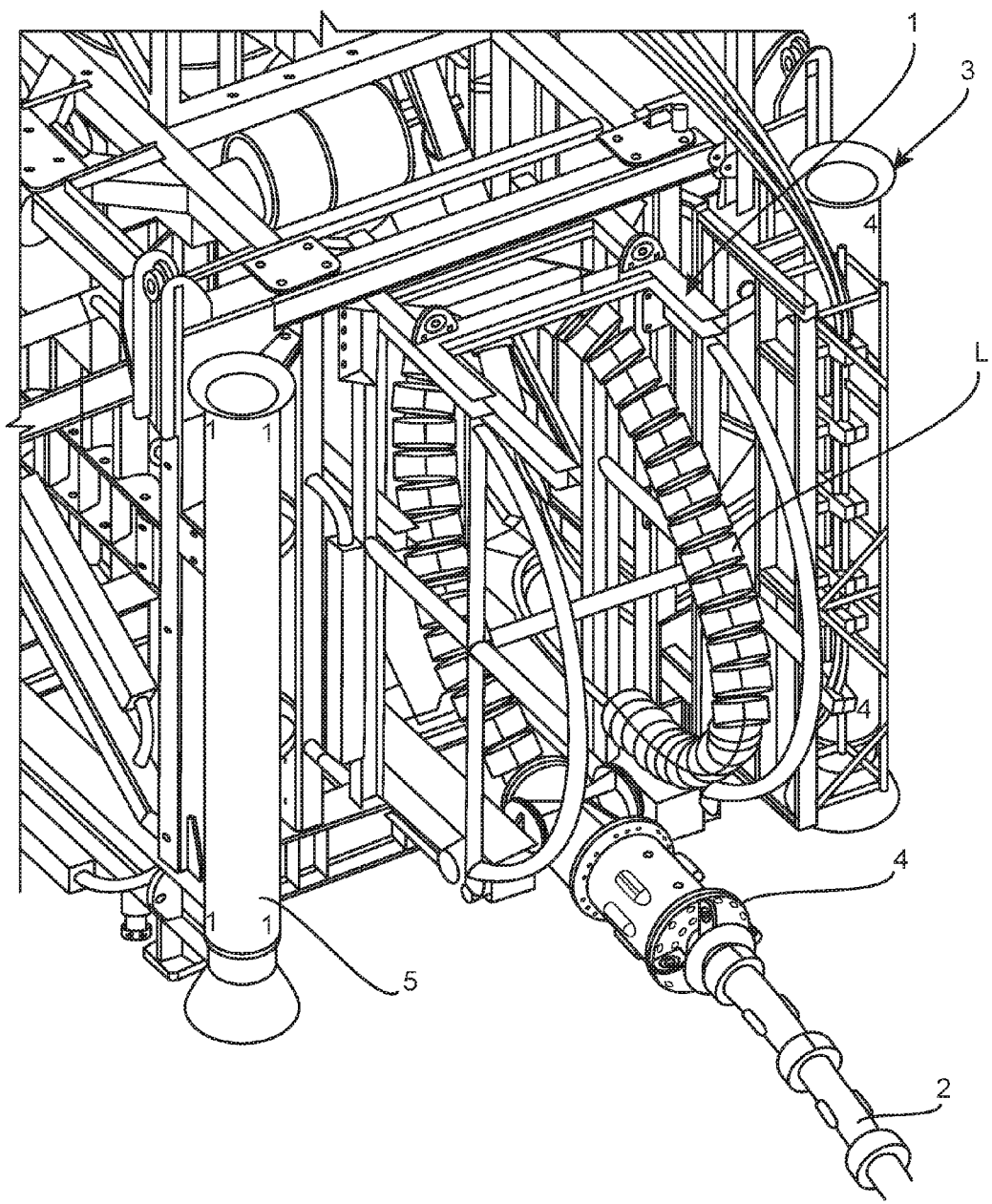
Figure 3:
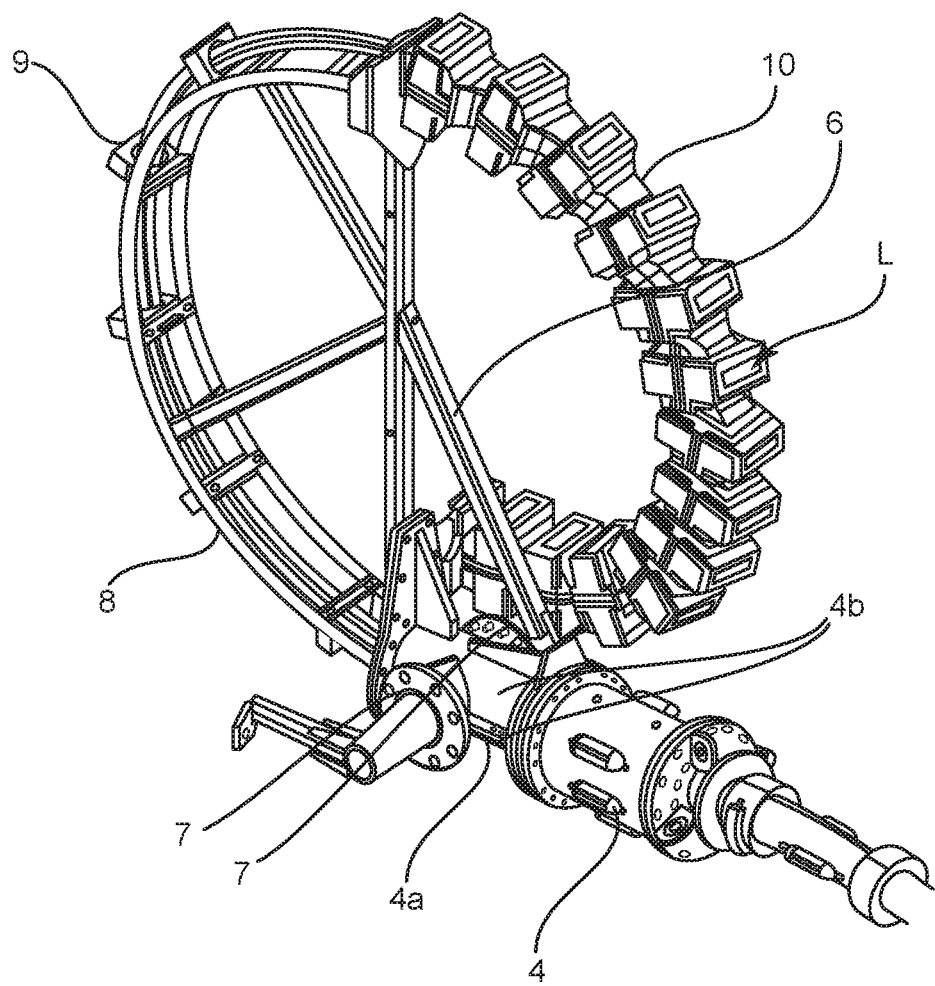
Figure 4A:
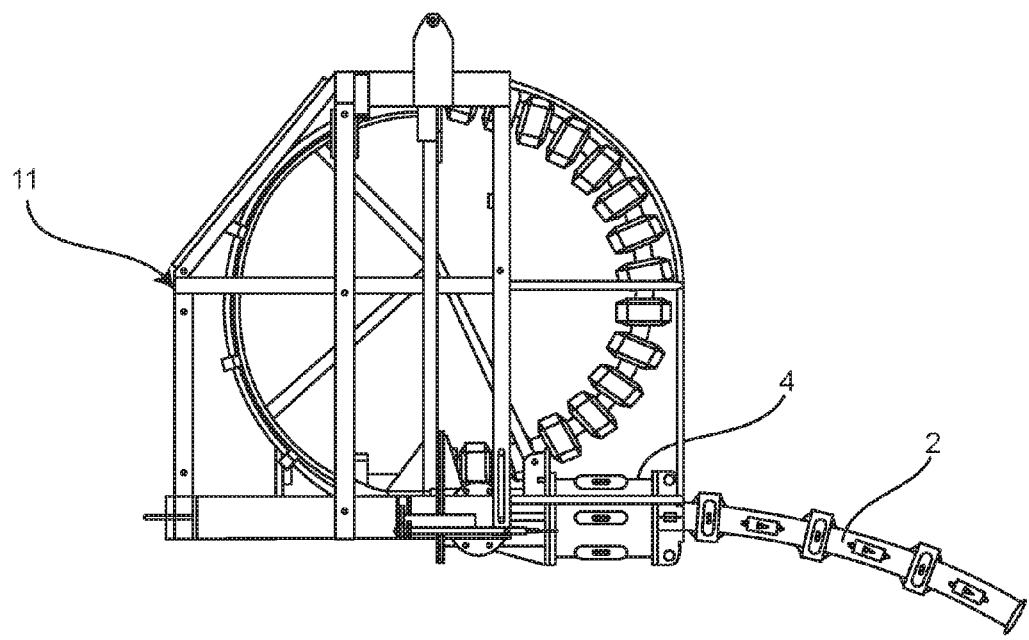
Figure 4B:
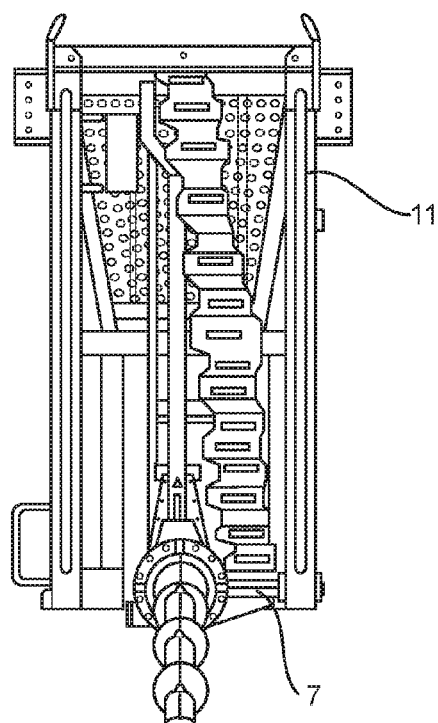
Figure 5:
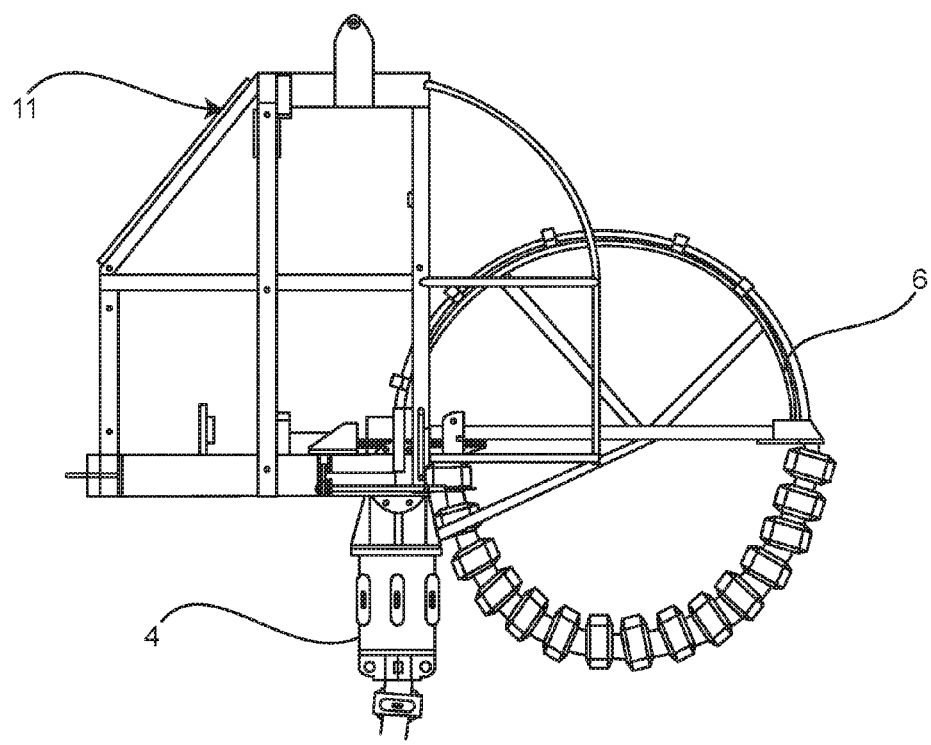
Figure 6:
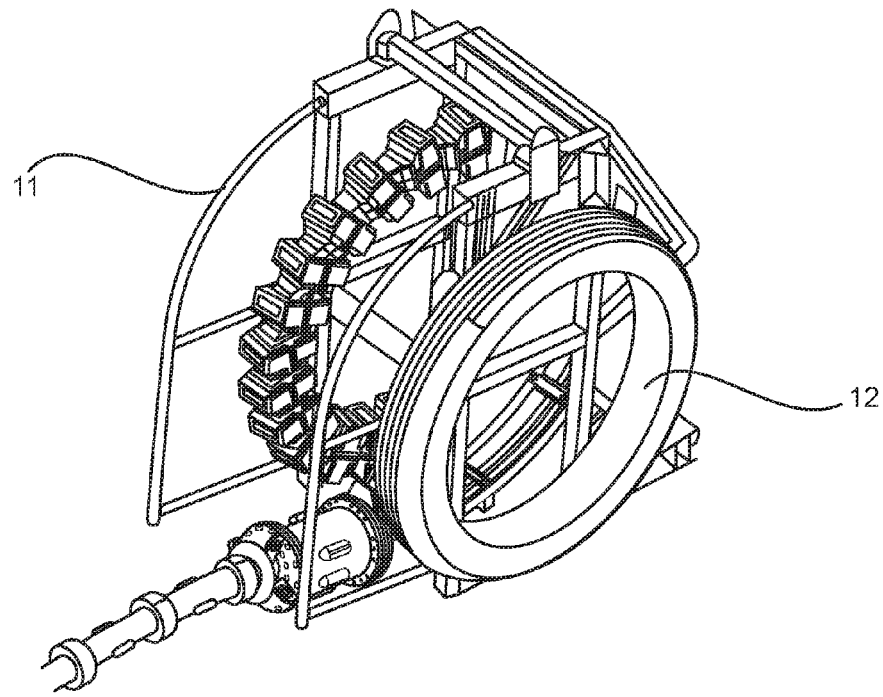
Figure 7:
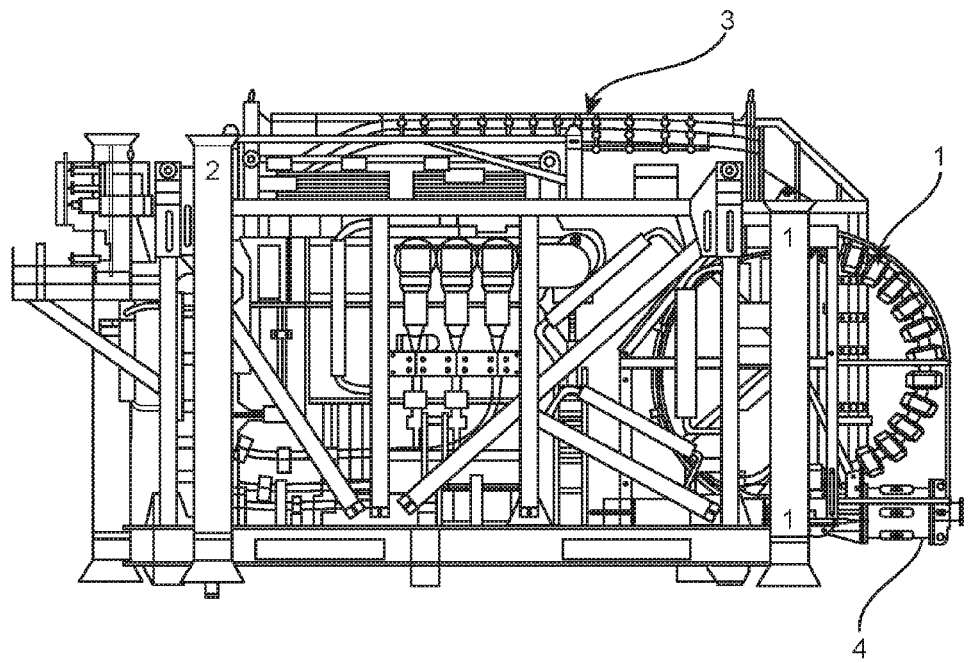
Figure 8:
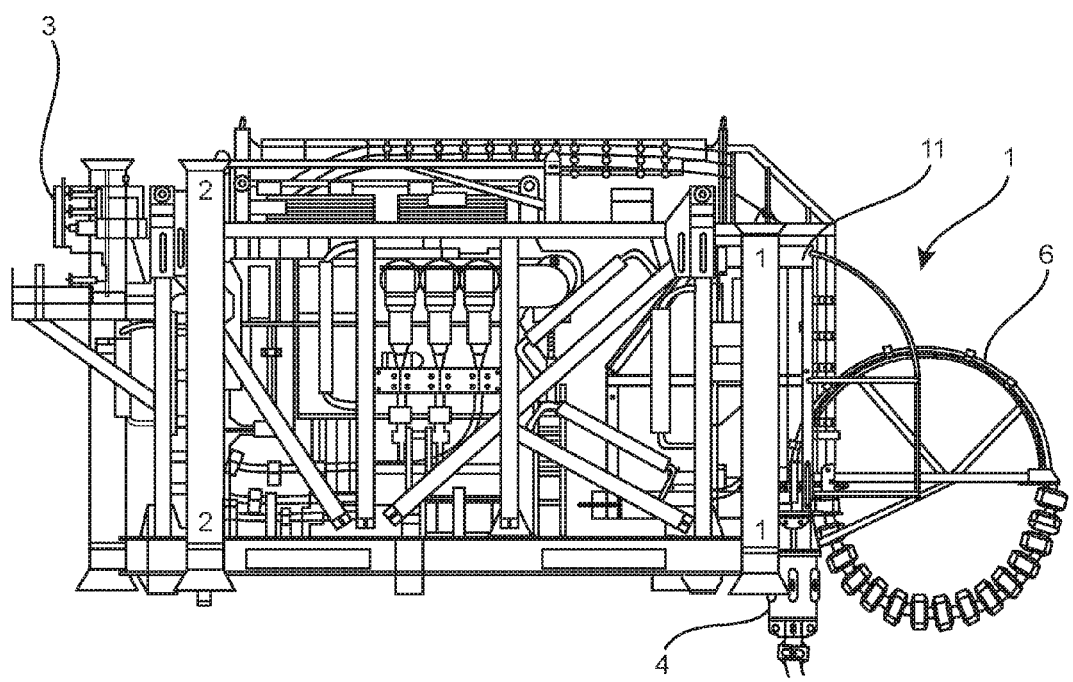

While the various aspects of the present invention has been described in general terms above, a more detailed and non-limiting example of an embodiment will be described in the following with reference to the drawings, in which:

FIG. 1A-1C shows various views, elevation, rear and top, of a hinged cable termination assembly according to the invention, FIG. 2 shows the hinged cable termination assembly according to the invention when connected and installed into a subsea structure, FIG. 3 shows the base parts of a hinged cable termination assembly according to the invention, FIG. 4A shows the assembly of FIG. 3 installed into an intermediate frame structure and with the termination head in horizontal position, FIG. 4B shows a front view of the assembly shown in FIG. 4A, FIG. 5 shows the assembly of FIG. 3 installed into the intermediate frame structure and with the termination head in vertical position, FIG. 6 shows the assembly of FIG. 3 installed into the intermediate frame structure and with an auxiliary cable drum secured to the intermediate frame, FIG. 7 shows an elevation view of a subsea structure with the FIG. 4A assembly installed in one end of the subsea structure and with the termination head in horizontal position, and FIG. 8 shows an elevation view of a subsea structure with the FIG. 4A assembly installed in one end of the subsea structure and with the termination head in vertical position.

Reference is firstly made to FIG. 1A-1C that shows a "hinged termination assembly" 1 that will constitute a first end of a cable, a power cable, a power umbilical or an umbilical 2 intended for deployment on the seabed, hereafter termed a "cable 2" in general. The cable 2 is intended to extend between to seabed structures, or from a surface vessel (not shown) to a seabed structure 3, as shown in FIG. 2. The seabed structure 3 itself is well known by a person skilled in the art and will not be described in detail. In this hinged termination assembly 1, the cable 2 ends in a termination head 4, but continues into the subsea structure 3 by making a loop like a pigtail in order to be able to perform its function. This will be outlined and described later together with a description of the hinged termination assembly when installed. In this area adjacent to the termination head 4, the cable 2 is actually hidden within the shown bend restrictors. The sequence of bend restrictors ensures that the cable 2 at any point, will not kink.

FIG. 1A shows two different positions of the hinged termination assembly 1 in elevated side view. FIG. 1B shows a rear view of the hinged termination assembly 1 and FIG. 1C shows a top view of same.

Reference is now made to FIG. 2 that shows a subsea structure 3, which can be a module, having the hinged termination assembly 1 as an integrated unit thereto. The hinged termination assembly 1 is arranged to the subsea structure 3 onboard a surface vessel and they are prepared for deployment together into the sea and subsequent lowering to the seabed. The water depths can be several hundred meters, or more.

The subsea structure 3 and the integrated termination assembly 1 are to be lowered together from a surface vessel that is located above a template or other subsea structure already installed on the seabed. The template is provided with guideposts and the subsea structure 3 is provided with guiding receptacles 5 intended for mating with the template guideposts in order to have the subsea structure 3 correctly landed and installed onto the template. When the subsea structure 3 is safely installed on the template, the structure 3 will be located within the boundaries of the framework of the template and can be completely covered by shielding plates assembled to the framework in order to avoid hooking of fishing gears like trawling nets or even falling objects descending through the sea.

A second end of the cable 2 remains onboard the surface vessel during such lowering operation of the subsea structure 3. The subsea structure 3 will typically be lowered into the sea by use of hoisting gears (not shown) and be suspended in a yoke, a four sling or similar.

As shown in closer detail in FIG. 3, the hinged termination assembly 1 includes a spider structure 6 supporting the cable in the pigtail loop. In the shown embodiment, the termination head 4 includes trunnions 7, which are bolted to the termination head housing 4a, in order to enable pivotal motions about a pivot axis. The solid trunnion bar is rotatably supported in a structural pipe or similar. The termination head 4 can be locked in horizontal position where it is required to be horizontal.

The hinged termination assembly 1 includes a semicircular support structure 8 supporting the cable 2 in the loop. A series of cable clamps 9 secure the cable 2 to the semicircular support structure 8 in this part of the loop.

The shown hinged termination assembly 1 further includes a semicircular bend restrictor structure 10 supporting the cable 2 in the second half of the pigtail loop.

In one embodiment, as shown in FIGS. 4A, 4B and 5, the hinged termination assembly 1 may further include an intermediate frame structure 11, which is arranged to carry the termination head 4, the semicircular support structure 8 and the semicircular bend restrictor structure 10 as a module. Then the module will be an assembly independent from the subsea structure; which can be removed as a unit or an assembly. Before integration of the hinged termination head assembly into the subsea structure or system, it can act as a pull-in head which enables transport of the pigtail cables along with subsea umbilical, as shown in FIG. 6.

The subsea termination head 4 may also include a housing 4a having hang-off split flanges 4b.

As shown in FIG. 6, the hinged termination unit 1 can also include an auxiliary cable drum 12, or umbilical drum 12, arranged to be secured to the intermediate frame structure 11.

As mentioned, the spider frame structure 6 includes a bend stiffener arrangement 10 supporting the cable 2 loop when the cable has taken the final deployed horizontal position on the seabed. The cable termination head 4 is, as mentioned, journalled by means of trunnions 7 or similar to the termination head housing 4a. One trunnion 7 is located on each side of the housing 4a and in the lower part of the spider frame structure 6. This particular "hinging" feature of the termination unit, makes the unit able to pivot or tilt, normally spanning a pivot angle of about 90 degrees.

In brief, and to be understood from the various drawings, including FIGS. 7 and 8, the subsea termination head assembly 1 is adapted for both communicating connection and controlled load carrying connection via a termination head 4 to a subsea structure 3 to be installed on the seabed. The termination head 4 allows a subsea cable, a power cable, a power umbilical or an umbilical, to be connected to a subsea structure before lowering them as an assembly from a vessel and into the sea. The termination head assembly 1 and subsea structure 3 are to be lowered together while concurrently paying out cable 2, or umbilical 2, all the way to the seabed. To enable this, the termination head 4 is arranged to be hingedly connected relative to the subsea structure 3. This allows the termination head 4 to pivot about a pivot axis in order to let the subsea cable 2, or umbilical 2, adopt a natural catenary curvature in the sea during lowering thereof. The cable 2, or umbilical 2, extends in a pigtail loop from the termination head 4 and into the subsea structure 3. The pigtail loop of the cable 2 is able to perform a "rolling motion" during such pivotal movement of the termination head 4.

Lowering Operation

It is to be understood that during a lowering operation of the subsea structure 3, the cable 2, or umbilical 2, performs a big catenary loop extending substantially vertically downwards from the subsea structure 3, as illustrated in FIG. 8, turning gradually through a large U upwardly to the surface vessel. The cable 2, or umbilical 2, is continuously being paid out during such lowering operation of the subsea structure 3. When the subsea structure 3 nearly has reached the sea bed, the paying out of cable 2, or umbilical 2, is stopped and the termination head 4 gradually starts turning. When landed on the seabed, the cable 2 has adopted a substantially horizontal position, as illustrated in FIG. 7, before turning upwards towards the surface vessel. Subsequently the vessel can start moving to the next location for the second end of the cable 2, or umbilical 2, while deploying cable lengths or umbilical lengths.

The invention claimed is:

1. A subsea termination head assembly adapted for both communicating and controlled load carrying connection via a termination head to a subsea structure to be installed on the seabed, which termination head allows a subsea cable, a power cable, a power umbilical or an umbilical, to be connected to said subsea structure before lowering said cable, or said umbilical, as a unit from a vessel and into the sea, said termination head assembly and subsea structure are to be lowered together while concurrently paying out said cable, or said umbilical, all the way to the seabed, wherein said termination head is arranged to be hingedly connected relative to said subsea structure, which allows the termination head to pivot about a pivot axis in order to let said subsea cable, or said umbilical, adopt a natural catenary curvature in the sea during lowering thereof, said cable, or said umbilical, extends in a pigtail loop from said termination head and into said subsea structure, said pigtail loop being able to perform a rolling motion during such pivotal movement of said termination head.

2. The subsea termination head assembly according to claim 1, wherein the location of said pivot axis of said hinged termination head provides the resultant force from the weight of the cable, or the umbilical, to move closer to the global center of gravity of the subsea structure.

3. The subsea termination head assembly according to claim 1, wherein the location of said pivot axis of said hinged termination head is in the lower end of the termination head assembly.

4. The subsea termination head assembly according to claim 1, wherein the pivotal angular motions of said termination head is approximately 90 degrees from a substantially horizontal position to a substantially vertical position.

5. The subsea termination head assembly according to claim 1, wherein said termination head includes trunnions to enable pivotal motions about said pivot axis.

6. The subsea termination head assembly according to claim 1, wherein said subsea termination head assembly includes a semicircular structure and cable clamps supporting the cable, or said umbilical, in said pigtail loop configuration.

7. The subsea termination head assembly according to claim 1, wherein said subsea termination head assembly further includes a semicircular bend restrictor structure supporting the cable, or said umbilical, in said pigtail loop configuration.

8. The subsea termination head assembly according to claim 1, wherein said subsea termination head assembly includes an intermediate frame structure arranged to carry said termination head assembly, a semicircular structure and a semicircular bend restrictor structure being a module independent from said subsea structure.

9. The subsea termination head assembly according to claim 1, wherein said subsea termination head includes a housing having hang-off split flanges.

10. The subsea termination head assembly according to claim 1, wherein said subsea termination head assembly includes an auxiliary cable drum, or an umbilical drum, arranged to be secured to an intermediate frame structure.

11. The subsea termination head assembly according to claim 2, wherein the location of said pivot axis of said hinged termination head is in the lower end of the termination head assembly.

12. The subsea termination head assembly according to claim 2, wherein the pivotal angular motions of said termination head is approximately 90 degrees from a substantially horizontal position to a substantially vertical position.

13. The subsea termination head assembly according to claim 3, wherein the pivotal angular motions of said termination head is approximately 90 degrees from a substantially horizontal position to a substantially vertical position.

14. The subsea termination head assembly according to claim 2, wherein said termination head includes trunnions to enable pivotal motions about said pivot axis.

15. The subsea termination head assembly according to claim 3, wherein said termination head includes trunnions to enable pivotal motions about said pivot axis.

16. The subsea termination head assembly according to claim 4, wherein said termination head includes trunnions to enable pivotal motions about said pivot axis.

17. The subsea termination head assembly according to claim 2, wherein said subsea termination head assembly includes a semicircular structure and cable clamps supporting the cable, or said umbilical, in said pigtail loop configuration.

18. The subsea termination head assembly according to claim 3, wherein said subsea termination head assembly includes a semicircular structure and cable clamps supporting the cable, or said umbilical, in said pigtail loop configuration.

19. The subsea termination head assembly according to claim 4, wherein said subsea termination head assembly includes a semicircular structure and cable clamps supporting the cable, or said umbilical, in said pigtail loop configuration.

20. The subsea termination head assembly according to claim 5, wherein said subsea termination head assembly includes a semicircular structure and cable clamps supporting the cable, or said umbilical, in said pigtail loop configuration.

* * * * *